(12) United States Patent
Li et al.

(10) Patent No.: US 11,256,344 B2
(45) Date of Patent: Feb. 22, 2022

(54) PASSIVE ELECTROMAGNELIC PEN

(71) Applicant: HANVON UGEE TECHNOLOGY CO., LTD., Shenzhen Guangdong (CN)

(72) Inventors: Yuanzhi Li, Shenzhen Guangdong (CN); Liming Deng, Shenzhen Guangdong (CN)

(73) Assignee: HANVON UGEE TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/277,833

(22) PCT Filed: Oct. 18, 2018

(86) PCT No.: PCT/CN2018/110836
§ 371 (c)(1),
(2) Date: Mar. 19, 2021

(87) PCT Pub. No.: WO2020/056833
PCT Pub. Date: Mar. 26, 2020

(65) Prior Publication Data
US 2021/0311572 A1  Oct. 7, 2021

(30) Foreign Application Priority Data
Sep. 19, 2018 (CN) .......................... 201811094907.3

(51) Int. Cl.
*G06F 3/0354* (2013.01)
(52) U.S. Cl.
CPC ................................ *G06F 3/03545* (2013.01)
(58) Field of Classification Search
CPC .................................................. G06F 3/03545
See application file for complete search history.

(56) References Cited

U.S. PATENT DOCUMENTS 5,565,632 A    10/1996  Ogawa
2011/0084846 A1  4/2011  Li et al.
(Continued)

FOREIGN PATENT DOCUMENTS

CN    200939759 Y    8/2007
CN    101901046 A    12/2010
(Continued)

OTHER PUBLICATIONS

First Office Action, The State Intellectual Property Office of People's of Republic of China, Application No. 201811094907.3, dated Jun. 17, 2019,10 pages.
(Continued)

*Primary Examiner* — Peter D McLoone
(74) *Attorney, Agent, or Firm* — Vorys, Sater, Seymour and Pease LLP

(57) ABSTRACT

Disclosed is a passive electromagnetic pen, which includes a pen core, a first iron core, and an iron core holder, wherein a coil is wound outside the first iron core, the first iron core is fixed to an end of the iron core holder close to a pen tip of the pen core, a second iron core, an elastic component, a pressure regulating plate, and a first structure matched with the pressure regulating plate are disposed in the iron core holder sequentially from front to back, and the pen core is configured to pass through a center of the first iron core, and then drive the second iron core to move; and the pressure regulating plate when in rotation is configured to be in surface contact with the first structure by a surface, so as to generate an axial displacement to change an axial displacement of the elastic opponent.

9 Claims, 2 Drawing Sheets

(56) References Cited

U.S. PATENT DOCUMENTS

| | | | | |
|---|---|---|---|---|
| 2014/0043300 | A1* | 2/2014 | Lien | G06F 3/03545 |
| | | | | 345/179 |
| 2016/0018912 | A1* | 1/2016 | Kaneda | G06F 3/033 |
| | | | | 345/179 |

FOREIGN PATENT DOCUMENTS

| CN | 103631399 A | 3/2014 |
|---|---|---|
| CN | 103677337 A | 3/2014 |
| CN | 204066032 U | 12/2014 |
| CN | 204270250 U | 4/2015 |
| CN | 204440332 U | 7/2015 |
| CN | 106354285 A | 1/2017 |
| CN | 206021215 U | 3/2017 |
| CN | 206209627 U | 5/2017 |
| CN | 107521259 A | 12/2017 |
| CN | 107924211 A | 4/2018 |
| CN | 208834271 U | 5/2019 |
| CN | 208834272 U | 5/2019 |
| CN | 209305180 U | 8/2019 |
| CN | 109032396 B | 3/2020 |
| DE | 2305002 A1 | 8/1973 |
| DE | 19602851 A1 | 7/1997 |
| EP | 1331547 A1 | 7/2003 |
| JP | H0496212 A | 3/1992 |
| JP | 408227336 A | 9/1996 |
| TW | M445213 U | 1/2013 |

OTHER PUBLICATIONS

International Search Report, China National Intellectual Property Administration (ISA/CN), PCT/CN2018/110836, dated Jun. 20, 2019, 4 pages.

Notification to Grant Patent Right for Invention, The State Intellectual Property Office of People's of Republic of China, Application No. 201811094907 3, 3 pages.

Written Opinion of the International Search Authority, PCT/CN2018/110836, 5 pages.

\* cited by examiner

471

PASSIVE ELECTROMAGNELIC PEN

CROSS-REFERENCE TO RELATED APPLICATIONS

This application is a national stage filing under 35 U.S.C. § 371 of international application number PCT/CN2018/110836, filed Oct. 18, 2018, which claims priority to Chinese patent application No. 201811094907.3, filed Sep. 19, 2018. The contents of these applications are incorporated herein by reference in their entirety.

TECHNICAL FIELD

The present disclosure relates to the field of information input devices, and more particularly, to a passive electromagnetic pen.

BACKGROUND

With the rapid development of computer technology, various hardware devices are changing with each passing day and emerging in endlessly. In input devices, there are various handwriting and drawing input devices to be more beneficial for input needs of handwriting and drawing, including a handwriting board, a drawing board, and the like, which can be collectively called the "drawing board".

The drawing board may be divided into a resistive type, a capacitive type, an electromagnetic type, a surface acoustic wave type, an optical (infrared) type, and the like in technology, wherein the electromagnetic type is most widely used, and has been recognized by the market. The electromagnetic drawing board is further divided into an active type and a passive type. Accordingly, an electromagnetic pen included in an electromagnetic drawing board system is also divided into an active type and a passive type. A change of a frequency of the passive electromagnetic pen may be implemented by a variable capacitance technology or a variable inductance technology. In the electromagnetic drawing board system adopting the variable inductance technology of the passive electromagnetic pen, a changed inductor is connected in parallel with a capacitor on a PCBA initially. An antenna board may emit a frequency to charge the pen, when the antenna board stops emitting, the pen may be changed from receiving energy to emitting energy, and the inductor on the pen is changed, and is connected in parallel with the fixed capacitor on the PCBA, which may change a frequency emitted by the pen, such that the antenna board is capable of obtaining different frequencies of the pen, and different changes of a pressure value of the pen (reflecting a weight sense) are generated.

The variable inductance technology of the passive electromagnetic pen is mostly used in a coil-wound solenoid, and an inductance value is changed by moving an iron core in the solenoid; or in two iron cores on a same axis, one iron core is wound with a coil, and the other iron core is not wound with a coil, and the inductance value is changed by changing a distance between the two iron cores. Since the coil needs to be wound on the solenoid in the former, a diameter of the pen may be larger than that of the pen in the latter. In addition, the coil is wound on the solenoid in the former, which increases a distance between the coil and the iron core, such that energy loss of the former is larger than that of the latter.

However, at present, the passive electromagnetic pen adopting a distance relationship structure of two iron cores is composed of many parts, each part has its own manufacturing error, and each part is made of different materials. Therefore, a problem of size inconsistency often occurs during assembly and production, which leads to a condition that when the passive electromagnetic pen is delivered, an axial displacement space of an internal elastic component thereof is smaller or larger than a standard axial displacement space (which means that an actual size of the passive electromagnetic pen is smaller or larger than a standard size), such that it is difficult to ensure that weight senses of each passive electromagnetic pen are consistent, thereby being not conducive to mass production.

SUMMARY

In order to address the above technical problem, the present disclosure aims to provide a passive electromagnetic pen with a good consistency.

The technical solution adopted in the present disclosure is as follows: a passive electromagnetic pen includes a pen core, a first iron core, and an iron core holder, wherein a coil is wound outside the first iron core, the first iron core is fixed to an end of the iron core holder close to a pen tip of the pen core, a second iron core, an elastic component, a pressure regulating plate, and a first structure matched with the pressure regulating plate are disposed in the iron core holder sequentially from front to back, and the pen core is configured to pass through a center of the first iron core, and then drive the second iron core to move; and the pressure regulating plate when in rotation is configured to be in surface contact with the first structure by a surface so as to generate an axial displacement to change an axial displacement of the elastic opponent.

Further, a contact surface between the pressure regulating plate and the first structure is a first inclined plane, and a contact surface between the first structure and the pressure regulating plate is a second inclined plane.

Further, a thin film sheet is also disposed between the first iron core and the second iron core.

Further, a pen core clamp is also disposed between the second iron core and the elastic component.

Further, a step is provided at a tail end of the pen core.

Further, the elastic component comprises a silicone rod and a spring sleeved outside the silicone rod, and the silicone rod is fixedly connected with the pen core clamp.

Further, a PCBA circuit board is also disposed outside the iron core holder.

Further, a rotary handle is disposed on the pressure regulating plate.

Further, a first through hole is formed in the center of the first iron core, a second through hole is formed in a center of the second iron core, and a diameter of the first through hole is larger than that of the second through hole.

Further, an outer diameter of the first iron core is smaller than that of the second iron core.

The present disclosure has the beneficial effects that according to the passive electromagnetic pen of the present disclosure, the pressure regulating plate and the first structure matched with the pressure regulating plate are additionally provided, the pressure regulating plate in rotation is in surface contact with the first structure by the surface, such that the pressure regulating plate generates the axial displacement, so as to change the axial displacement of the elastic component, thereby enabling an actual size of the passive electromagnetic pen in delivery to be equal to a standard size by changing the axial displacement of the elastic component, ensuring consistent weight senses of each passive electromagnetic pen, and being conducive to mass production.

DETAILED DESCRIPTION

The present disclosure is further explained hereinafter with reference to the accompanying drawings and the specific embodiments of the specification.

Figure 1:
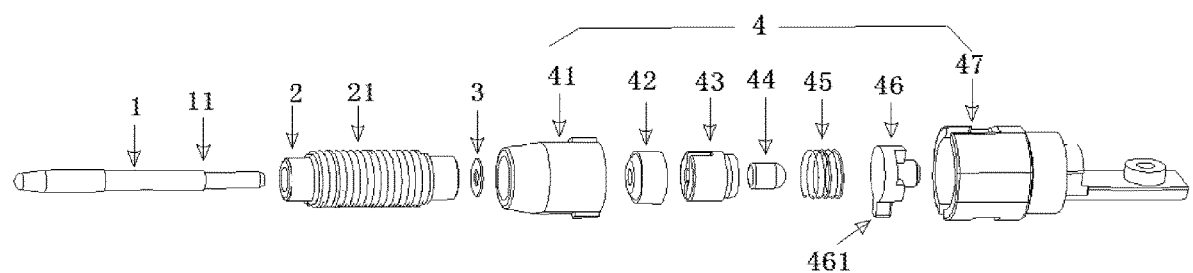
FIG. 1 is a stereoscopic exploded view of a passive electromagnetic pen of the present disclosure.
Figure 2:
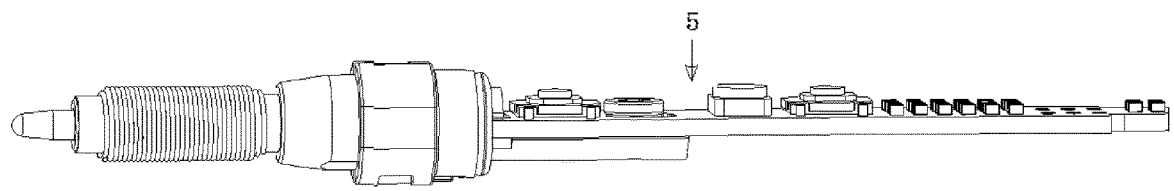
FIG. 2 is a schematic structural diagram of the passive electromagnetic ink pen of the present disclosure after assembly.

Referring to FIG. 1 and FIG. 2, a passive electromagnetic pen of the present disclosure includes a pen core 1, a first iron core 2, and an iron core holder 4. A coil 21 is wound outside the first iron core 2, the first iron core 1 is fixed to an end of the iron core holder 4 close to a pen tip of the pen core 1, a second iron core 42, an elastic component, a pressure regulating plate 46, and a first structure 47 matched with the pressure regulating plate 46 are disposed in the iron core holder 4 sequentially from front to back, and the pen core 1 passes through a center of the first iron core 2, and then drives the second iron core 42 to move. The pressure regulating plate 46 in rotation is in surface contact with the first structure 47 by a surface, such that the pressure regulating plate 46 generates an axial displacement, so as to change an axial displacement of the elastic opponent.

A passive electromagnetic pen with a distance relationship structure of two iron cores is used in the existing technology, which generally adopts a structure that an iron core without a wound coil is close to the pen tip. The pen tip pushes against the iron core without the wound coil, when the pen tip is stressed, the iron core without the wound coil may be forced to approach an iron core with a wound coil, resulting in a change of inductance. However, this structure often leads to a condition that a distance between the two iron cores cannot be too large, such that only an elastic element made of a very thin elastic material can be placed. After long-term use, the elastic element may fatigue elastically, causing the distance between the two iron cores to get out of control, such that the passive electromagnetic pen cannot be operated normally.

The distance relationship structure of two iron cores is also used in the passive electromagnetic pen of the present disclosure to change the inductance, but a difference in structure is that the iron core with the wound coil (i.e., the first iron core) is close to the pen tip, and the pen core passes through the center of the first iron core to push the iron core without the wound coil (i.e., the second iron core). This structure may provide an enough space behind the second iron core to design the elastic component, such that the pen tip has an excellent force feedback performance. In addition, a front end of the pen is a coil-wound iron core structure, and compared with a variable inductance structure that the coil is wound on a solenoid, a diameter of the pen is smaller, such that an appearance of the pen may be made thinner and more beautiful. Compared with the structure that the coil is wound on the solenoid, more energy is also obtained by the pen.

There is no too thin elastic component, and the product has a long service life. In the present disclosure, when the second iron core is pushed, an inductance value on the wound coil may be changed, and a changed inductor is connected in parallel with a capacitor on the PCBA circuit board. An antenna board may emit a frequency to charge the pen, when the antenna board stops emitting, the pen may be changed from receiving energy to emitting energy, and the coil-wound inductor on the pen is changed, and is connected in parallel with the fixed capacitor on the PCBA circuit board, which may change a frequency emitted by the pen, such that the antenna board is capable of obtaining different frequencies of the pen, and different changes of a pressure value of the pen are generated.

As shown in FIG. 1, the first iron core 2 and the second iron core 42 of the present disclosure are both a hollow structure, which may accommodate the pen core 1 to move in an axial direction in an interior thereof. The pen tip of the pen core 1 is located on the left, and the tail end is located on the right. As shown in FIG. 1 and FIG. 2, the iron core holder 4 includes a front portion 41 and a bottom portion (i.e., the first structure) 47 which are matched with each other, and the first iron core 2 is fixed on the front portion 41 of the iron core holder 4 from a direction of the pen tip, while the second iron core 42 is loaded into the iron core holder 4 from a direction of the pen tail. The first iron core 2 is fixed, and the second iron core 42 may be pushed by the pen core 1 in the iron core holder 4. The bottom portion 44 is capable of being combined with the front portion 41 in a rotating manner to form the iron core holder.

The axial displacement is generated by contact between the pressure regulating plate 46 in rotation and the first structure 47 in a way of a height change of an inclined plane (which is a contact surface between the pressure regulating plate and the first structure).

The elastic component is used for providing a reverse acting force to the pen core 1, such that a weight sense is obtained during writing with the pen core 1. In addition, the elastic component also provides a certain elastic margin, which is capable of enabling an actual size of the passive electromagnetic pen in delivery to be equal to a standard size by the axial displacement. The elastic component may adopt a spring, a rubber rod (such as a silicone rod), and other elastic structures, or may be a composite structure composed of the spring and the rubber rod.

Figure 3:
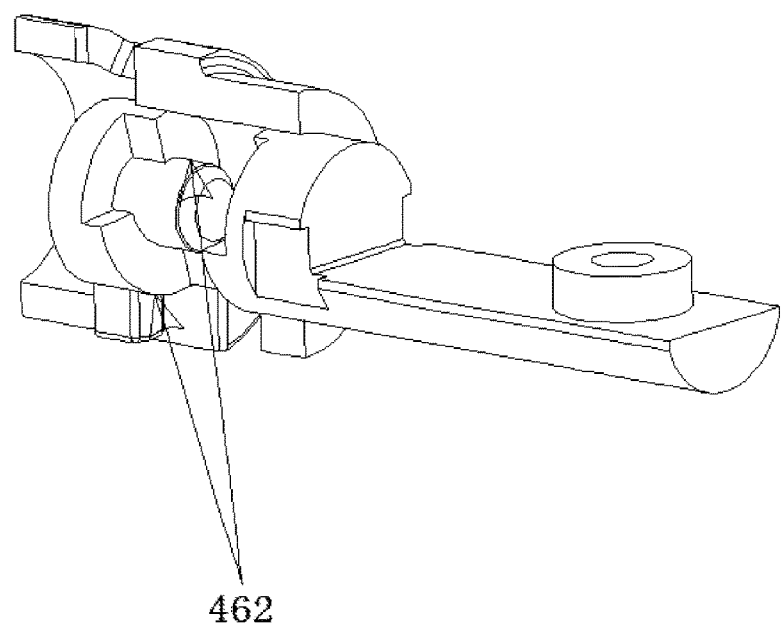
FIG. 3 is a sectional view of a pressure regulating plate of the present disclosure.
Figure 4:
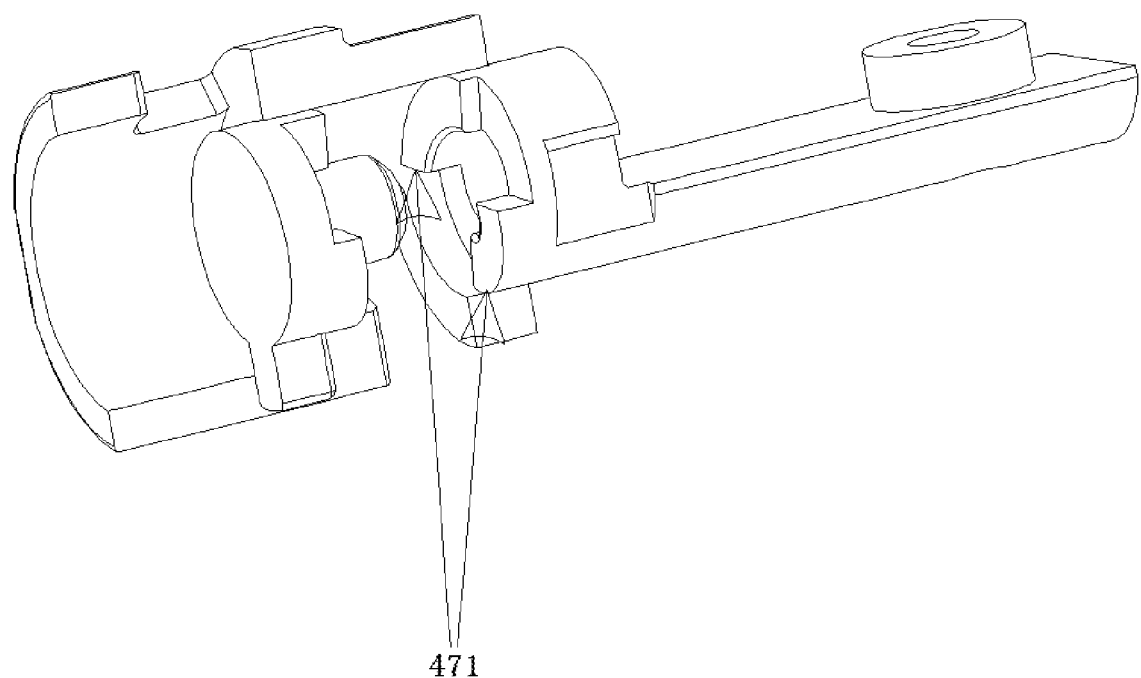
FIG. 4 is a sectional view of a first structure of the present disclosure.

Referring to FIG. 1, FIG. 3, and FIG. 4, further, as a preferred embodiment, a contact surface between the pressure regulating plate 46 and the first structure 27 is a first inclined plane 462, and a contact surface between the first structure 47 and the pressure regulating plate 46 is a second inclined plane 471.

The first inclined plane 462 and the second inclined plane 471 are neither perpendicular to or parallel to the axial direction of the pen core of the electromagnetic pen. An inclination angle and an inclination mode (such as left inclination, right inclination, and the like) of the first inclined plane 462 and the second inclined plane 471 may both be flexibly selected according to actual needs.

Contact surfaces between the pressure regulating plate 46 and the first structure 27 both adopt an inclined plane structure, such that since the pressure regulating plate 46 in rotation is in inclined surface contact with the first structure 47, the pressure regulating plate may rise or fall along the inclined plane, and then a space for accommodating the elastic component is changed, such that the elastic component moves in the axial direction, thereby changing the weight sense with the pen.

Referring to FIG. 1, further, as a preferred embodiment, a thin film sheet 3 is also disposed between the first iron core 2 and the second iron core 42.

A fixed and accurate distance must be kept between the first iron core 2 and the second iron core 42 of the present disclosure when the pen core 1 is not used for writing, such that the thin film sheet 3 with an accurate thickness is sandwiched therebetween to ensure the distance between the two iron cores.

Referring to FIG. 1, further, as a preferred embodiment, a pen core clamp 43 is also disposed between the second iron core 42 and the elastic component.

The pen core clamp 43 of the present disclosure is used for clamping the pen core 1.

Referring to FIG. 1, further, as a preferred embodiment, a step 11 is provided at a tail end of the pen core 1.

The step 11 is used for pushing the second iron core 42.

Referring to FIG. 1, further, as a preferred embodiment, the elastic component includes a silicone rod 44 and a spring 45 sleeved outside the silicone rod 44, and the silicone rod 44 is fixedly connected with the pen core clamp 43.

The silicone rod 44 and the spring 45 of the present disclosure are used for providing a reverse acting force to the pen core 1, such that the weight sense is obtained during writing with the pen core 1. Specifically, a part of length of the silicone rod 44 may be fixed in the pen core clamp 43, and the spring 45 is sleeved outside the silicone rod 44. When the pen core 1 is stressed, the silicone rod 44 and the spring 45 may exert a force towards the bottom portion (i.e., the first structure) 47 of the iron core holder to obtain a reverse acting force. Moreover, a contact surface between the silicone rod 44 or the spring 45 and the pressure regulating plate 46 may be a flat plane.

Referring to FIG. 2, further, as a preferred embodiment, a PCBA circuit board 5 is also disposed outside the iron core holder 4.

The PCBA circuit board 5 is electrically connected with the coil 21 to convert the changed inductance into a change of the frequency, such that the antenna board is capable of obtaining different frequencies of the pen, and different pressure values of the pen are generated. Specifically, the PCBA circuit board 5 is located behind the iron core holder 4, and may be fixedly connected with the iron core holder 4 by a screw and other modes.

Referring to FIG. 1, further, as a preferred embodiment, a rotary handle 461 is disposed on the pressure regulating plate 46.

In the present disclosure, the pressure regulating plate 46 may be rotated more conveniently by additionally providing the rotary handle 461. The rotary handle 461 may be partially exposed from an outer surface of the iron core holder 4.

Further, as a preferred embodiment, a first through hole is formed in the center of the first iron core, a second through hole is formed in a center of the second iron core, and a diameter of the first through hole is larger than that of the second through hole.

In the present disclosure, the diameter of the first through hole of the first iron core is larger than that of the second through hole of the second iron core, such that the pen core is capable of pushing the second iron core by the step at the tail end of the pen core.

Further, as a preferred embodiment, an outer diameter of the first iron core is smaller than that of the second iron core.

In the present disclosure, the outer diameter of the second iron core without the wound coil is larger than that of the first iron core with the wound coil. The outer diameter of the second iron core is reduced close to one end of the first iron core, such that an overall appearance of the pen may not be abrupt due to the second iron core without the wound coil in the interior, thereby having a better consistency in overall appearance.

The operating principle of the passive electromagnetic pen of the present disclosure is as follows: when the pen tip of the pen core is stressed during writing, the pen core passes through the center of the first iron core and the center of the second iron core, and then is clamped by the pen core clamp, and the second iron core is pushed to move in the axial direction by the step at the tail end of the pen core, such that different distances are formed between the first iron core and the second iron core, thereby changing the inductance value on the coil. The changed inductor is connected in parallel with the fixed capacitor on the PCBA circuit board, such that the frequency emitted by the pen is changed, and different changes of a pressure value of the pen are generated. Meanwhile, movement of the second iron core in the axial direction may drive the pen core clamp to squeeze the silicone rod and the spring, which gives the pen core the reverse acting force, thereby having the weight sense with the pen core. In addition, the pressure regulating plate and the first structure matched with the pressure regulating plate are additionally provided in the present disclosure, when the actual size of the passive electromagnetic pen in delivery needs to be equal to the standard size or different weight senses need to be obtained, only the rotary handle of the pressure regulating plate needs to be rotated, such that a surface contact mode between the pressure regulating plate and the first structure is changed (such as rising or falling of the inclined plane contacted) to generate the axial displacement. The axial displacement of the pressure regulating plate may change the space for accommodating the silicone rod and the spring, such that the silicone rod and the spring also generate corresponding axial displacement (the actual size of the passive electromagnetic pen in delivery is equal to the standard size or weight senses are obtained).

The foregoing describes the preferred embodiments of the present disclosure in detail, but the present disclosure is not limited to the embodiments. Those skilled in the art may further make various equivalent modifications or substitutions without violating the spirit of the present disclosure, and these equivalent modifications or substitutions are all included in the scope defined by the claims of the present application.

What is claimed is:

1. A passive electromagnetic pen, comprising:
    a pen core;
    a first iron core; and
    an iron core holder,
    wherein a coil is wound outside the first iron core, the first iron core is fixed to an end of the iron core holder close to a pen tip of the pen core, a second iron core, an elastic component, a pressure regulating plate, and a first structure matched with the pressure regulating plate are disposed in the iron core holder sequentially from front to back, and the pen core is configured to pass through a center of the first iron core, and then drive the second iron core to move;
    wherein the pressure regulating plate when in rotation is configured to be in surface contact with the first structure by a surface, so as to generate an axial displacement to change an axial displacement of the elastic opponent;
    wherein the first iron core and the second iron core are both a hollow structure, a thin film sheet with an accurate thickness is disposed between the first iron core and the second iron core to ensure the distance between the first iron core and the second iron core, a pen core clamp is disposed between the second iron core and the elastic component for clamping the pen core, a step is provided at a tail end of the pen core for pushing the second iron core, the elastic component comprises a silicone rod and a spring sleeved outside the silicone rod, and the silicone rod is fixedly connected with the pen core clamp.

2. The passive electromagnetic pen of claim 1, wherein a contact surface between the pressure regulating plate and the first structure is a first inclined plane, and a contact surface between the first structure and the pressure regulating plate is a second inclined plane.

3. The passive electromagnetic pen of claim 2, wherein a rotary handle is disposed on the pressure regulating plate.

4. The passive electromagnetic pen of claim 2, wherein a first through hole is formed in the center of the first iron core, a second through hole is formed in a center of the second iron core, and a diameter of the first through hole is larger than that of the second through hole.

5. The passive electromagnetic pen of any one of claim 2, wherein an outer diameter of the first iron core is smaller than that of the second iron core.

6. The passive electromagnetic pen of claim 1, wherein a PCBA circuit board is disposed outside the iron core holder.

7. The passive electromagnetic pen of claim 1, wherein a rotary handle is disposed on the pressure regulating plate.

8. The passive electromagnetic pen of claim 1, wherein a first through hole is formed in the center of the first iron core, a second through hole is formed in a center of the second iron core, and a diameter of the first through hole is larger than that of the second through hole.

9. The passive electromagnetic pen of claim 1, wherein an outer diameter of the first iron core is smaller than that of the second iron core.

\* \* \* \* \*